United States Patent
Williams

(10) Patent No.: US 7,257,259 B2
(45) Date of Patent: Aug. 14, 2007

(54) LOSSLESS VARIABLE-BIT SIGNATURE COMPRESSION

(75) Inventor: Baron D. Williams, Santa Clara, CA (US)

(73) Assignee: @Pos.Com, Inc., San Jose, CA (US)

(*) Notice: Subject to any disclaimer, the term of this patent is extended or adjusted under 35 U.S.C. 154(b) by 1010 days.

(21) Appl. No.: 09/981,546

(22) Filed: Oct. 17, 2001

(65) Prior Publication Data

US 2003/0072493 A1    Apr. 17, 2003

(51) Int. Cl.
*G06K 9/36* (2006.01)
(52) U.S. Cl. .................... 382/232; 382/173
(58) Field of Classification Search ........... 382/232, 382/173, 240, 145; 345/420, 623, 427; 704/260, 704/500, 258, 262; 707/9, 3, 5
See application file for complete search history.

(56) References Cited

U.S. PATENT DOCUMENTS

| | | | | |
|---|---|---|---|---|
| 4,701,960 A | * | 10/1987 | Scott | 382/122 |
| 4,763,274 A | * | 8/1988 | Junker et al. | 702/38 |
| 5,091,975 A | * | 2/1992 | Berger et al. | 382/123 |
| 5,642,466 A | * | 6/1997 | Narayan | 704/260 |
| 5,710,916 A | * | 1/1998 | Barbara et al. | 707/9 |
| 5,748,904 A | * | 5/1998 | Huang et al. | 345/544 |
| 5,857,029 A | | 1/1999 | Patel | |
| 5,949,422 A | * | 9/1999 | Mochizuki et al. | 345/420 |
| 6,011,873 A | | 1/2000 | Rafi et al. | |

FOREIGN PATENT DOCUMENTS

| | | | |
|---|---|---|---|
| EP | 0822516 A2 | * | 2/1998 |
| JP | 401149185 A | * | 6/1989 |
| JP | 410097645 A | * | 4/1998 |

* cited by examiner

*Primary Examiner*—Anh Hong Do
(74) *Attorney, Agent, or Firm*—Fay Kaplun & Marcin, LLP

(57) ABSTRACT

Apparatus and methods for compressing data points. The invention compresses the representation of a sequence of points in a space by, for example, dividing the sequence of points into segments of successive points and then compressing each of the segments irrespective of the compression applied to the other segments. The dividing may include dividing the points sequence into segments of S successive points. The value of S may be the value of S generating the smallest of the multiple compressions. The compression may include compressing each of the segments of S successive, i-bit points into segments of j-bit points, where j<=i, j may vary from segment to segment and, for any given segment, j is the minimum number of bits necessary to represent the data in that given segment.

22 Claims, 7 Drawing Sheets

LOSSLESS VARIABLE-BIT SIGNATURE COMPRESSION

This invention relates to computers, electronic signature capture and data compression. More particularly, the invention relates to electronically capturing and compressing signatures.

BACKGROUND

The art includes a Five-Byte Packet (FBP) procedure for compressing electronic signatures. The FBP procedure stores signature data such as LineTos and MoveTos, as well as other specific data about the hardware touch pad such as whether the pen is UP or DOWN. A signature is a collection of such five-byte packets representing (absolute or relative) movements.

Notably, the FBP procedure does not compress data.

(A "LineTo" is a movement with the pen down. A LineTo draws a line of a signature. A "MoveTo" is a movement with the pen up. No signature line results from a MoveTo.)

The art also includes a word-signature (SIG) format. Like the FBP format, the SIG format stores MoveTos and LineTos in order to reconstruct a signature. SIG stores movements as absolute data and, in contrast to the FBP format, compresses the resulting data. The SIG format does not store hardware status.

SIG is a four-byte format. Two bytes store the X (horizontal) MoveTo or LineTo data. An additional two bytes store the corresponding Y data.

Pen-status data is encoded as predetermined special MoveTo/LineTo data to indicate a PenUp. The next data point is then a MoveTo. All data points not preceded by the predetermined special data point are LineTos.

Such a data scheme limits the resolution of the signature to less than the position represented by the predetermined special data. However, where the resolution of the signature pad is less than the predetermined special data point, the SIG format is an effective compression—particularly because LineTo's are many times more frequent that MoveTo's in signature data.

Prior-art signature compression processes reduced the "pixel" resolution of the signature. This reduction destroyed a portion of the data to be captured.

Accordingly, the art evinces a need for a process for electronically capturing and compressing signatures that produces high compression ratios and nonetheless retains all of the original signature information.

These and other goals of the invention will be readily apparent to one of ordinary skill in the art on reading the background above and the description below.

(The drawings are not to scale.)

SUMMARY

Herein are taught apparatus and methods for compressing data points. The invention compresses the representation of a sequence of points in a space by, for example, dividing the sequence of points into segments of successive points and then compressing each of the segments irrespective of the compression applied to the other segments. The dividing may include dividing the points sequence into segments of S successive points.

Before the dividing, the invention may determine the value of S by generating multiple compressions of the sequence, each of the multiple compressions at a different value of S. A compression of the sequence for each value of S from a minimum to a maximum is generated. (The minimum may be two (2) and the maximum the number of points in the sequence.) The value of S may be the value of S generating the smallest of the multiple compressions.

The compression may include compressing each of the segments of S successive, i-bit points into segments of j-bit points, where $j<=i$, j may vary from segment to segment and, for any given segment, j is the minimum number of bits necessary to represent the data in that given segment.

The compression may include determining the largest coordinate in any dimension of any point in a segment, setting j for the segment to the ceiling of the base-2 log of that largest coordinate, and truncating from points of the segment most significant bits exceeding j bits.

The sequence of points may be an electronic signature. The compressing may involve compressing each of the segments without losing any of the data in any of the segments or may involve compressing each of the segments, losing data as directed by an invoking user.

Before the dividing, the data may be converted to relative-movement data.

In various embodiment, the invention is data stores holding computer programs for executing the above, as well as compressors incorporating such data stores and CPUs for executing the programs therein.

DESCRIPTION OF THE INVENTION

Figure 1:
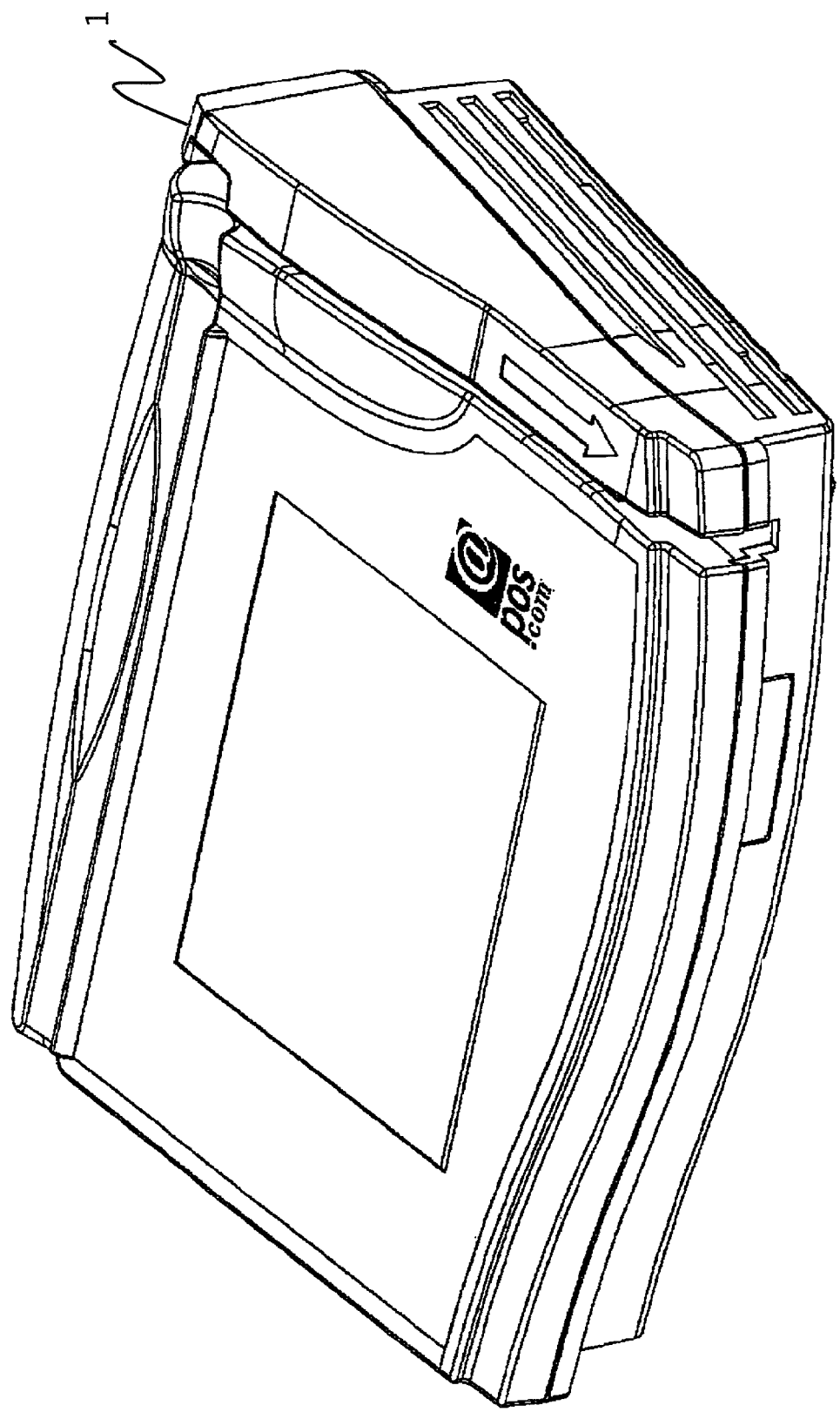
FIG. 1 illustrates an apparatus for electronically capturing signatures.

Herein are taught apparatus and methods for compressing an electronically captured signature. FIG. 1 illustrates an apparatus 1 for electronically capturing signatures. The apparatus 1 is the iPOS 3100, a terminal available from the assignee of the instant invention.

Signature-capture platforms 1 translate movement of a stylus on a touch pad, for example, into electronic ink. Where the platform 1 requests a signature, the electronic ink may be interpreted and stored as a signature. Such a platform 1 includes a processor, CPU, ASIC or other computing device (the compressor) that compresses according to various embodiments of the invention described herein.

Figure 2A:
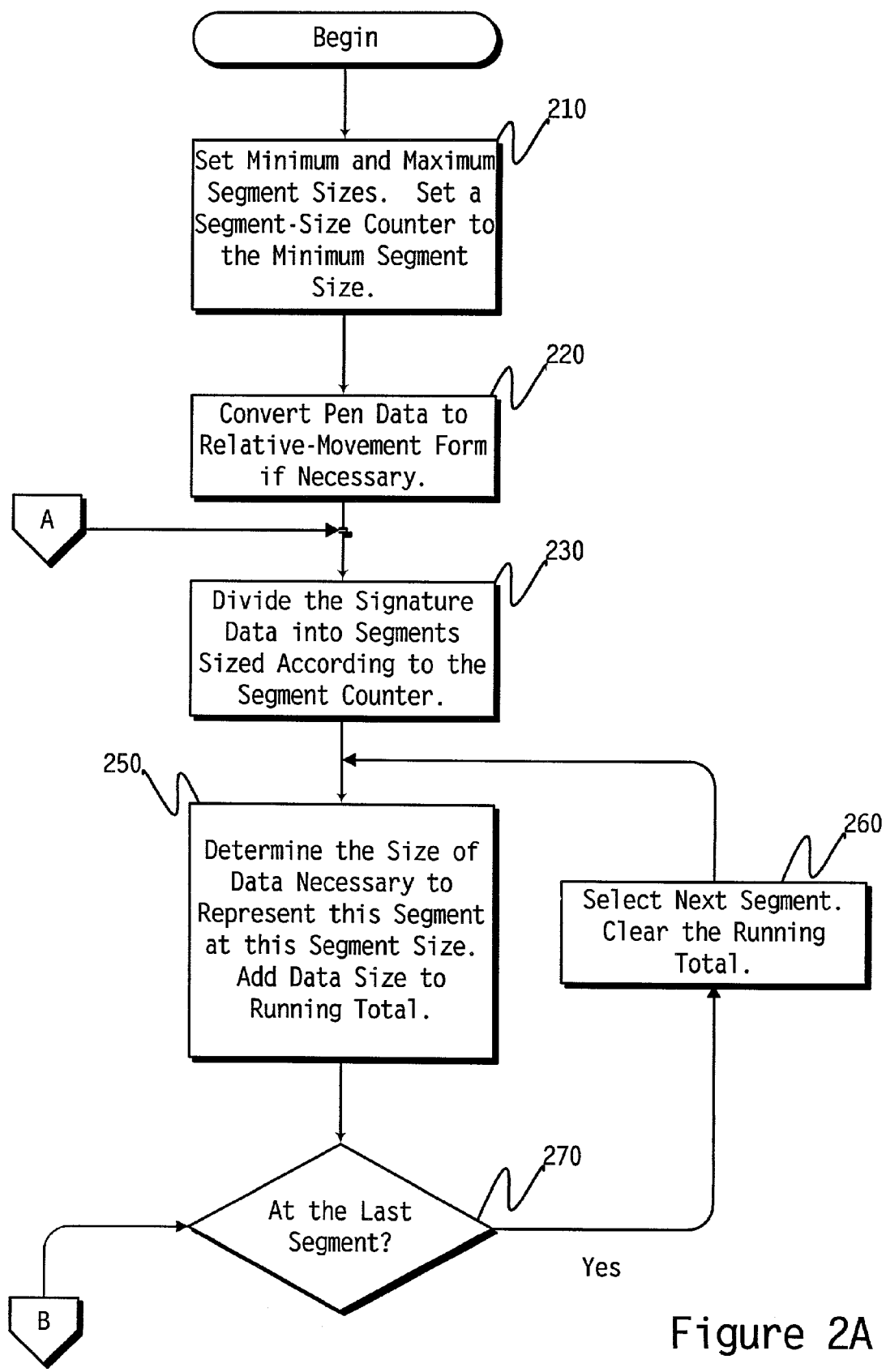
FIGS. 2A and 2B are a flowchart illustrating the flow of control in the compressor according to one embodiment of the invention.
Figure 2B:
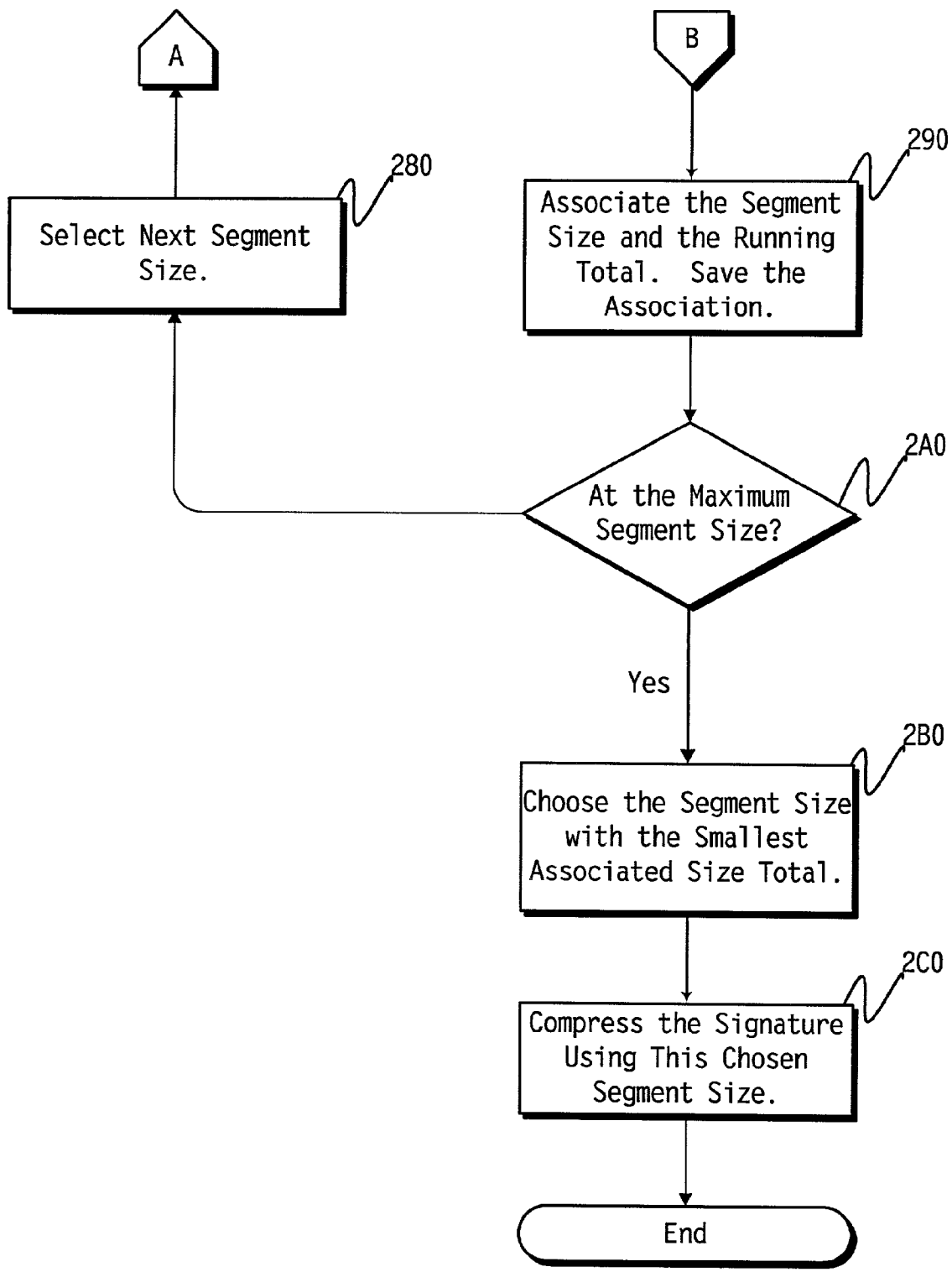

FIGS. 2A and 2B are a flowchart illustrating the flow of control in the compressor according to one embodiment of the invention. A device such as the apparatus 1 divides the signature into segments, each including a fixed number S of consecutive signature data points, step 2C0. This fixed number of points is the segment size S. (The last segment may have less than the fixed number of signature data points where the total number of points is not a multiple of the segment size.) The device then compresses each segment using the least number of bits necessary to represent the data points in that segment, step 2C0.

To determine the segment size S to use for compression, the device selects a minimum segment size and a maximum segment size, step 210. In one embodiment, these are two (2) and the size of the whole signature, respectively.

For each value between the minimum and maximum segment sizes, the process may loop and process the signature to determine the total amount of bits required to represent the whole signature based on segments sized according to the current segment size, S, steps 230 through 2A0. The compressor may record the number of bits necessary to store the signature at each segment size, step 290.

If, for example, the segment size S is currently ten (10) points, then the compressor divides the signature data points into segments of ten (10) successive points, step 230. The compressor examines every ten (10) successive points as a single data segment. The compressor determines how many bits j are required to represent each coordinate of all ten signature points in that segment, step 250.

One large movement in a segment may require many bits to represent a coordinate and thus each of the data in that segment. Conversely, many small movements in a segment may require only a few bits to represent each coordinate of each data point in the segment.

Thus each segment may have its own bit resolution. A compressed signature may have compressed segments with bit resolutions j that vary from one segment to the next.

Once the compressor has tested all possible segment sizes S, step 2A0, it compares the recorded results. It chooses the segment size S that minimizes the bits necessary to store the signature, step 2B0. It then compresses the signature using that chosen segment size and outputs the resulting compression.

Figure 6:
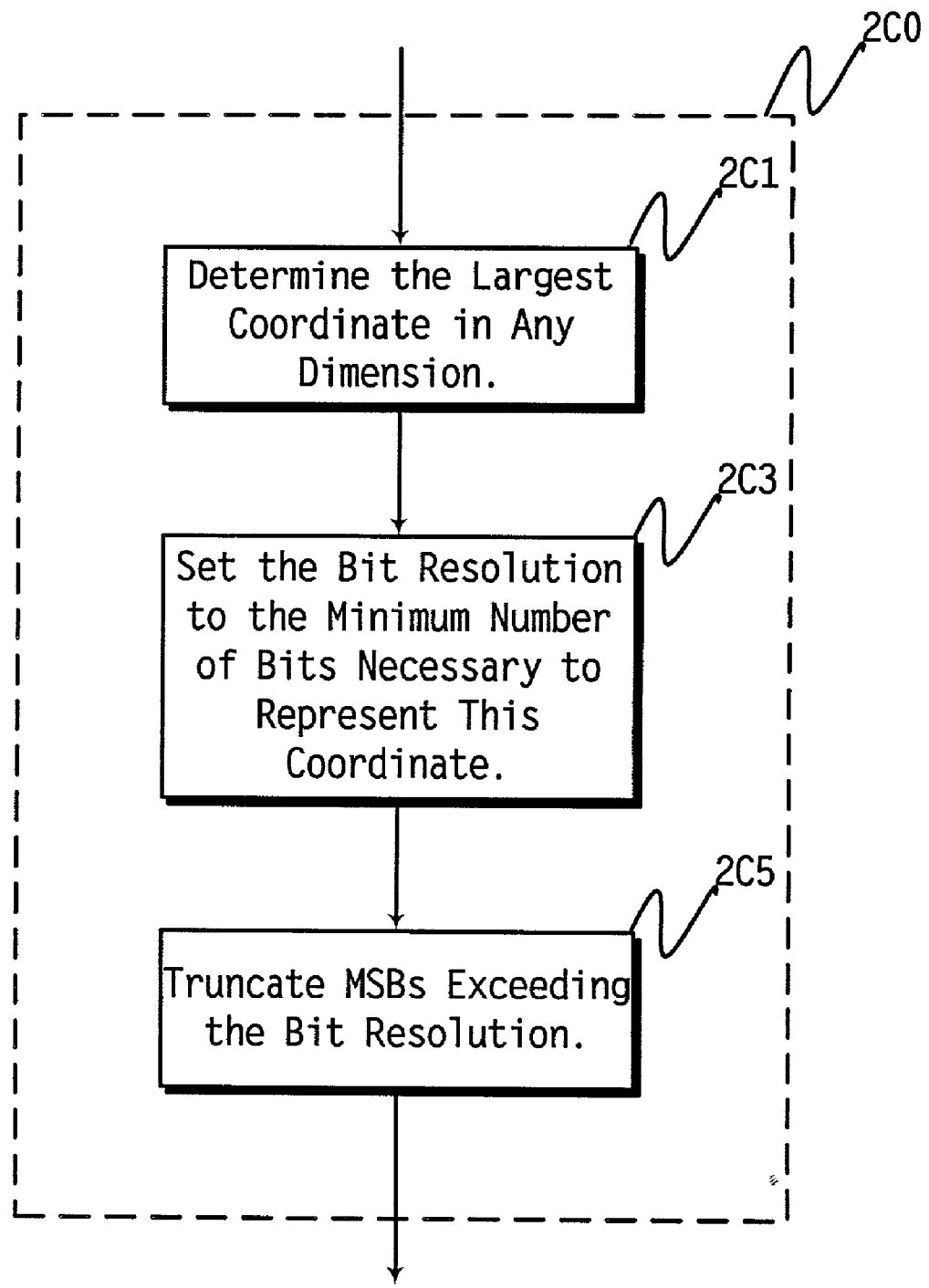
FIG. 6 illustrates the step of compressing of FIG. 2B, according to one embodiment of the invention.

For a given segment at a given segment size S, the compressor may compress the signature data as follows: The compressor converts DrawTo data to relative-movement data, step 220. The compressor determines the magnitude of the largest relative movement M (in any dimension) in the segment, step 2C1 of FIG. 6. The minimum number of bits necessary to represent this magnitude |M| is the bit resolution j of the segment, step 2C3. In other words, the segment bit resolution j is set to $\lceil \log_2 |M| \rceil$, the ceiling of the base-2 logarithm of the magnitude of M.

For each signature data point in the segment, the compressor snips off the most significant bits exceeding that segment bit resolution, step 2C5. The truncated data points represent the compressed segment data. The size of the segment is N*S*(j+1), where N is the number of dimensions for the signature data, S is the segment size and j is the segment bit resolution. The extra bit is the sign bit representing the direction of the relative data.

The data size of the signature at a given segment size S is the sum of such segment data sizes.

Figure 3A:
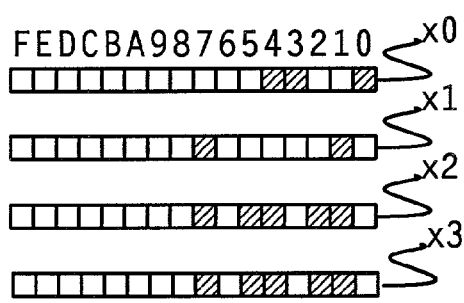
FIGS. 3A through 4C illustrate compression according to one embodiment of the invention.
Figure 3A:
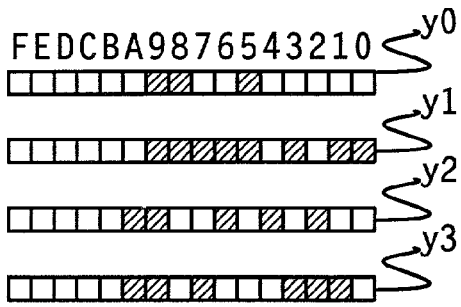

FIGS. 3A through 4C illustrate compression according to one embodiment of the invention. In FIGS. 3A-3B, the 16-bit DrawTo signature points (25, 800), (130, 1003), (182, 1620) and (182, 1678) are compressed. These four point tuples $(x_n, y_n)$ are indexed from 0 through 3.

Figure 3B:
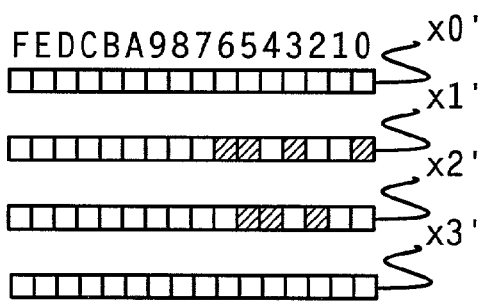
Figure 3B:
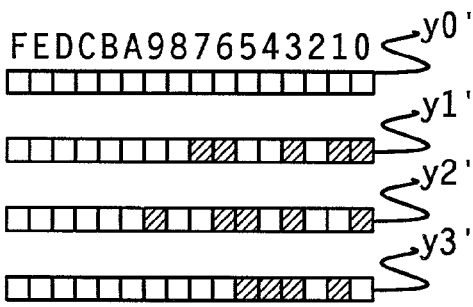

The absolute-position signature points are converted to relative-movement data $(x_n', y_n')$ as represented in FIG. 3B: (0, 0), (105, 203), (52, 617) and (0, 58). The largest relative-movement coordinate in any dimension is 617. The minimum number of bits necessary to wigs represent (the magnitude of) this relative-movement coordinate is 10.

Figure 3C:
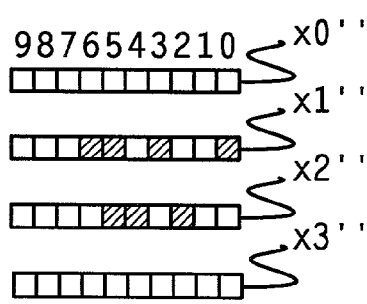
Figure 3C:
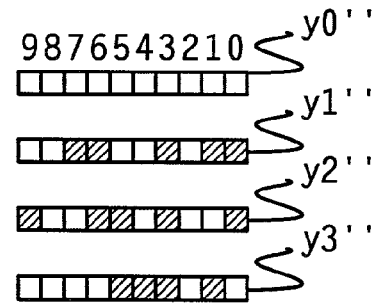

FIG. 3C recasts the relative-movement data $(x_n', y_n')$ as 11-bit data $(x_n'', y_n'')$, that is to say, 10 bits of magnitude plus 1 (one) sign bit. The compressed four points now consume 88 bits (N=2, S=4, ; j=10). This is in comparison to the original space requirement of 128 bits. Thus, for this four-point segment, the compression is 31%.

Figure 4A:
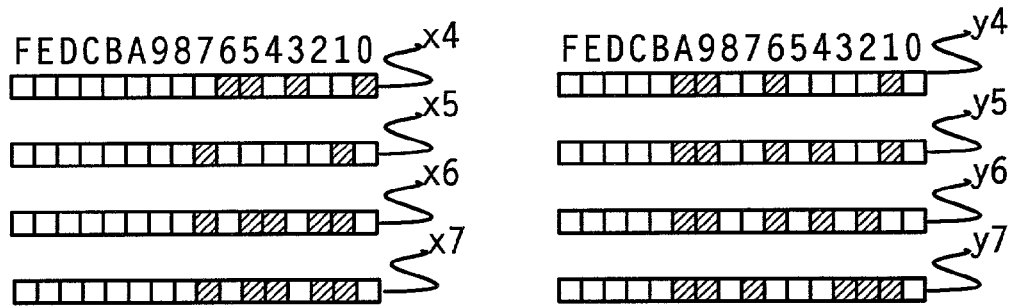
Figure 4B:
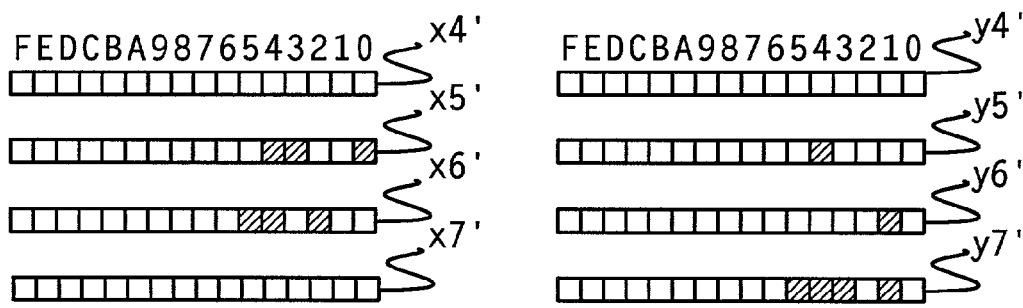
Figure 4C:
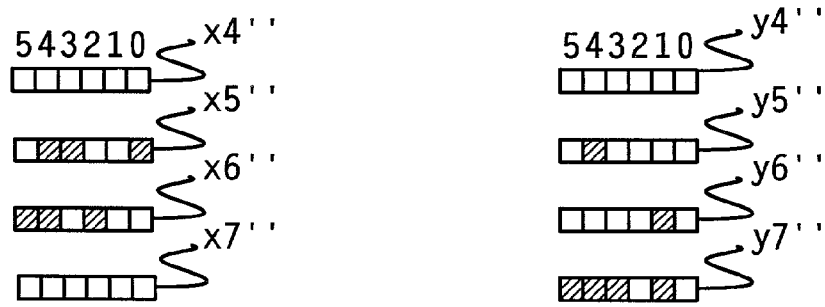

In FIGS. 4A-4C, the 16-bit DrawTo signature points (105, 1602), (130, 1618), (182, 1620) and (180, 1678) are compressed. These four point $(x_n, y_n)$ tuples are indexed from 4 through 7.

The absolute-position signature points are converted to relative-movement data $(x_n', y_n')$ as represented in FIG. 4B: (0, 0), (25, 16), (52, 2) and (−2, 58). This relative-movement data requires six (6) bits to represent. No coordinate value exceeds $2^7-1$.

FIG. 4C recasts the relative-movement data $(x_n', y_n')$ as 7-bit data $(x_n'', y_n'')$. The compressed four points now consume 56 bits (N=2, S=4, j=6). This is in comparison to the SIG-format space requirement of 128 bits. Thus, for this four-point segment, the compression is 56%.

Figure 5:
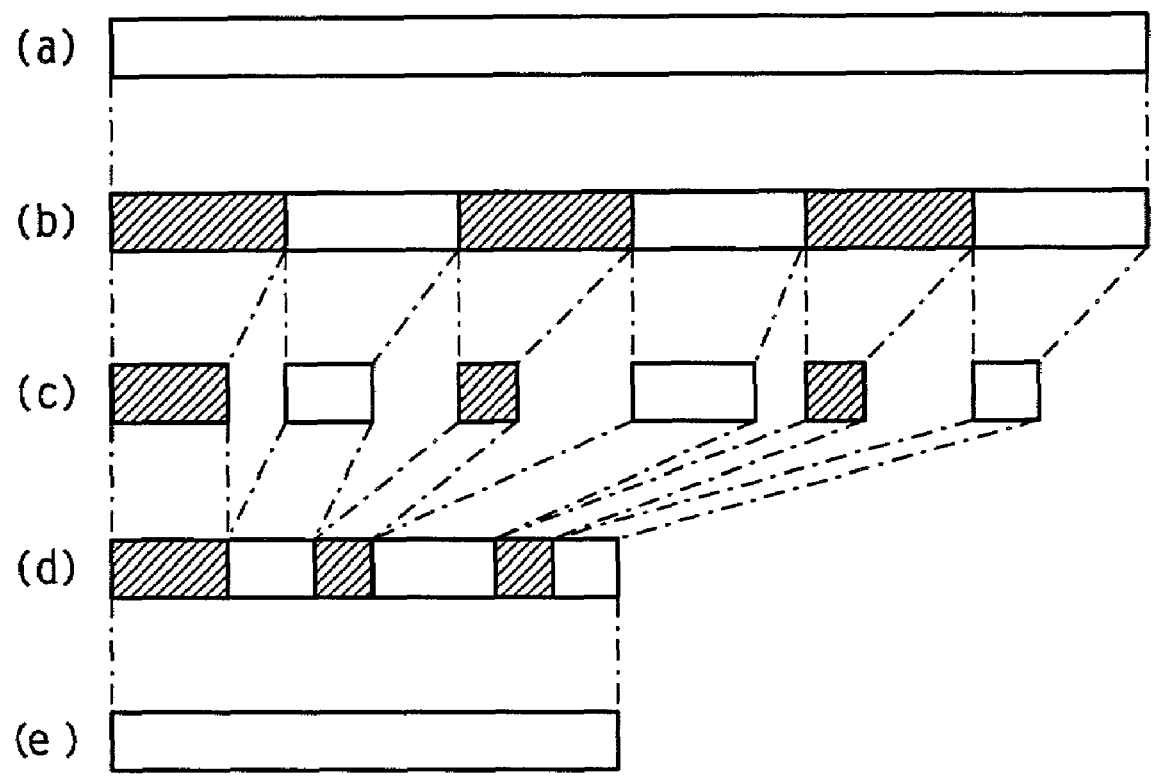
FIG. 5 abstractly illustrates the overall compression process according to one embodiment of the invention.

FIG. 5 abstractly illustrates the overall compression process according to one embodiment of the invention. At (a) is the original uncompressed signature data. At (b), this signature data is divided into equally sized segments. At (c), each segment of data is compressed, using only the number of bits required for that segment. The size of each segment in (c) varies as the bit resolution of each segment varies.

At (d), the compressed segments are combined in the order of their respective progenitor segments to create a single compressed data stream. At (e), the compressed data stream is no longer divided into segments. This is the product of the compression.

Empirically, the size of data compressed according to the present invention has been 19% to 36% of the size of FBP-formatted data and 24% to 44% of the size of SIG-formatted data. This compression is achieved without any loss of data.

A header for a compressed signature may include the following information:
a header string such as "VBC 1.0© 2000 @pos.com, Inc.,"
the horizontal DPI (dots per inch) of the signature,
the vertical DPI of the signature,
the width in pixels of the signature "paper,"
the height in pixels of the signature "paper,"
the number of points in the signature and
the segment size.

Special cases include the following: A data point with a predetermined value—(0, 0), for example—may indicate that the immediately succeeding data point is a MoveTo. The first point in a signature may be a MoveTo data point.

In one embodiment, a MoveTo data point is absolute and uncompressed. That is to say, the coordinates of a MoveTo data point may be represented in the original bit precision (i) of the signature data. If uncompressed, the coordinates may not influence the determination of the bit size j of a segment.

In another embodiment, the MoveTo coordinates are compressed.

MoveTo's occur infrequently in the typical signature—say, three to five, depending on the complexity of the signature. Thus, even if not compressed, MoveTo's minimally impact the size of a compressed signature.

A signature may have no MoveTo data point at its start or elsewhere. The entire signature data is then relative.

(LineTo's may always be relative to the preceding data point, even if that data point is in the preceding segment.)

The invention now being fully described, one of ordinary skill in the art will readily recognize many changes and modifications that can be made thereto without departing from the spirit of the appended claims. For example, the description above uses segments that have the same number of signature data points in size but may vary in bit resolution. Different sizes for segments are possible, although this requires more compression time.

Also, the results of each signature compression generated in the loop of determining the optimal segment size may be stored. When the optimal segment size has been determined, the compressor need not re-compute the compressed signature data. Rather, it discards all of the stored signatures compressed at different segment sizes—save the one with the optimal segment size.

The compression process may be directed to operate in a lossy way—by the setting a predetermined flag, for example. The flag may even direct the degree of lossiness. At the cost of reducing the resolution of the signature data, the compression of the signature is better. Where space is a concern, lossy compression may be desirable.

Finally, the compression taught herein is applicable to other scenarios than electronic signatures. The invention may apply to electronic drawings such as vector line graphics, and, in general, to ordered data points representing changes (such as movement) in a real or abstract space.

What is claimed is:

1. A method for compressing a representation of a sequence of points in a space, the method comprising:
    dividing the sequence of points into segments of successive points;
    determining a compression size for each of the segments, wherein the compression size varies based on a number of bits needed to represent relative distances between the points of each segment;
    compressing each of the segments into the compression size for each segment; and
    combining the compressed segments into a data stream.

2. The method of claim 1, wherein the step of dividing comprises
    dividing a sequence of paints into segments of S successive, i-bit points.

3. The method of claim 2, wherein before the step of dividing, the following step is performed:
    determining the value of S.

4. The method of claim 3, wherein the step of determining the value of S comprises
    generating multiple compressions of the sequence, each of the multiple compressions at a different value of S.

5. The method of claim 3, wherein the step of determining the value of S comprises
    generating a compression of the sequence for each value of S from a minimum to a maximum.

6. A method for compressing the representation of a sequence of points in a space, the method comprising:
    dividing a sequence of points into segments of S successive points; and
    compressing each of the segments irrespective of the compression applied to the other segments, wherein before the step of dividing, the value of S is determined, and wherein the step of determining the value of S comprises generating a compression of the sequence for each value of S from a minimum of two (2) to a maximum equal to the number of points in the sequence.

7. The method of claim 3, wherein the step of determining the value of S comprises
    generating multiple compressions of the sequence, each of the multiple compressions at a different value of S; and
    determining the value of S to be the value of S generating the smallest of the multiple compressions.

8. The method of claim 2, wherein the step of compressing comprises
    compressing each of the segments of S successive, i-bit points into segments of j-bit points, where $j<=i$.

9. The method of claim 8, wherein the value of j may vary from segment to segment.

10. The method of claim 8, wherein, for any given segment, j is the minimum number of bits necessary to represent the data in that given segment.

11. A method for compressing the representation of a sequence of points in a space, the method comprising:
    dividing a sequence of points into segments of S successive points; and
    compressing each of the segments irrespective of the compression applied to the other segments, wherein the step of compressing comprises
    determining the largest coordinate in any dimension of any point in a segment;
    setting j for the segment to the ceiling of the base-2 log of that largest coordinate; and
    truncating from points of the segment most significant bits exceeding j bits.

12. The method of claim 1, wherein the sequence of points is an electronic signature.

13. The method of claim 1, wherein the step of compressing comprises
    compressing each of the segments without losing any of the data in any of the segments.

14. The method of claim 1, wherein the step of compressing comprises
    compressing each of the segments, losing data as directed by an invoking user.

15. The method of claim 1, wherein before the step of dividing the following step is performed:
    converting DrawTo data to relative-movement data.

16. A method for compressing an electronic signature, the method comprising:
    dividing an electronic signature comprising a sequence of i-bit points into segments of successive points numbering S;
    compressing each of the segments into segments of j-bit points without losing any of the data in the signature by
    determining the largest coordinate in any dimension of any point in a segment;
    setting j for the segment to the ceiling of the base-2 log of that largest coordinate; and
    truncating from points of the segment most significant bits exceeding j bits.

17. The method of claim 16, wherein before the step of dividing, the following steps are performed:
    converting DrawTo data to relative-movement data;
    generating multiple compressions of the sequence, each of the multiple compressions at a different value of S; and
    determining the value of S to be the value of S generating the smallest of the multiple compressions.

18. A computer readable medium wherein is located a computer program for compressing a representation of a sequence of points in a space by:
    dividing the sequence of points into segments of successive points;
    determining a compression size for each of the segments, wherein the compression size varies based on a number of bits needed to represent relative distances between the points of each segment;

compressing each of the segments into the compression size for each segment; and combining the compressed segments into a data stream.

19. A computer readable medium wherein is located a computer program for compressing an electronic signature by:
- dividing an electronic signature comprising a sequence of i-bit points into segments of successive points numbering S;
- compressing each of the segments into segments of j-bit points without losing any of the data in the signature by
  - determining the largest coordinate in any dimension of any point in a segment;
  - setting j for the segment to the ceiling of the base-2 log of that largest coordinate; and
  - truncating from points of the segment most significant bits exceeding j bits.

20. The computer readable medium of claim 19, wherein the computer program compresses an electronic signature by, before the step of dividing:
- converting DrawTo data to relative-movement data;
- generating multiple compressions of the sequence, each of the multiple. compressions at a different value of S; and
- determining the value of S to be the value of S generating the smallest of the multiple compressions.

21. A compressor for compressing a representation of a sequence of points in a space, comprising:
- a computer readable medium wherein is located a computer program for compressing the representation of the sequence of points in the space by:
  - dividing the sequence of points into segments of successive points;
  - determining a compression size for each of the segments, wherein the compression size varies based on a number of bits needed to represent relative distances between the points of each segment;
  - compressing each of the segments into the compression size for each segment; and
  - combining the compressed segments into a data stream,
- a CPU for executing the computer program in the data store; and
- a link, communicatively coupling the data store and the CPU.

22. A compressor for compressing an electronic signature, comprising:
- a computer readable medium wherein is located a computer program for compressing an electronic signature by:
  - dividing an electronic signature comprising a sequence of i-bit points into segments of successive points numbering S;
  - compressing each of the segments into segments of j-bit points without losing any of the data in the signature by
    - determining the largest coordinate in any dimension of any point in a segment;
    - setting j for the segment to the ceiling of the base-2 log of that largest coordinate; and
    - truncating from points of the segment most significant bits exceeding j bits;
- a CPU for executing the computer program in the data store; and
- a link, communicatively coupling the data store and the CPU.

* * * * *